(12) United States Patent
Journee et al.

(10) Patent No.: US 6,609,267 B1
(45) Date of Patent: Aug. 26, 2003

(54) MOTOR VEHICLE WIPER COMPRISING A PIVOTING LOCK

(75) Inventors: Maurice Journee, Reilly (FR); Jean-Pierre Jehannet, Vernon (FR)

(73) Assignee: Paul Journee, Cavee du Chateau (FR)

( * ) Notice: Subject to any disclaimer, the term of this patent is extended or adjusted under 35 U.S.C. 154(b) by 0 days.

(21) Appl. No.: 09/743,874

(22) PCT Filed: Jul. 16, 1999

(86) PCT No.: PCT/FR99/01738
  § 371 (c)(1),
  (2), (4) Date: Mar. 23, 2001

(87) PCT Pub. No.: WO00/05113
  PCT Pub. Date: Feb. 3, 2000

(30) Foreign Application Priority Data

Jul. 20, 1998 (FR) .............................. 98 09254

(51) Int. Cl.⁷ ................................. B60S 1/40
(52) U.S. Cl. ................................. 15/250.32
(58) Field of Search ............ 15/250.32, 250.361, 15/250.43, 250.44

(56) References Cited

U.S. PATENT DOCUMENTS

| | | | | |
|---|---|---|---|---|
| 4,209,874 A | * | 7/1980 | Hancu | 15/250.32 |
| 4,608,728 A | * | 9/1986 | Sumins et al. | 15/250.32 |
| 4,670,934 A | * | 6/1987 | Epple et al. | 15/250.32 |

FOREIGN PATENT DOCUMENTS

| | | |
|---|---|---|
| EP | 0 459 867 | 12/1991 |
| EP | 0 606 846 | 7/1994 |
| FR | 2 080 409 | 11/1971 |

* cited by examiner

Primary Examiner—Gary K. Graham
(74) Attorney, Agent, or Firm—Young & Basile, P.C.

(57) ABSTRACT

A motor vehicle wiper including a wiper blade which is articulated to the longitudinal end of a wiper arm via a connector which is articulated on the arm and fixed over a linking portion of the blade, and wherein the linking portion includes two substantially longitudinal and parallel lateral flanges and a transverse element extending between the two flanges and designed to cooperate with a mobile lock borne by the connector for fixing the connector on the blade. The invention is characterized in that the lock is articulated on the connector between a locking position and an unlocking position.

22 Claims, 3 Drawing Sheets

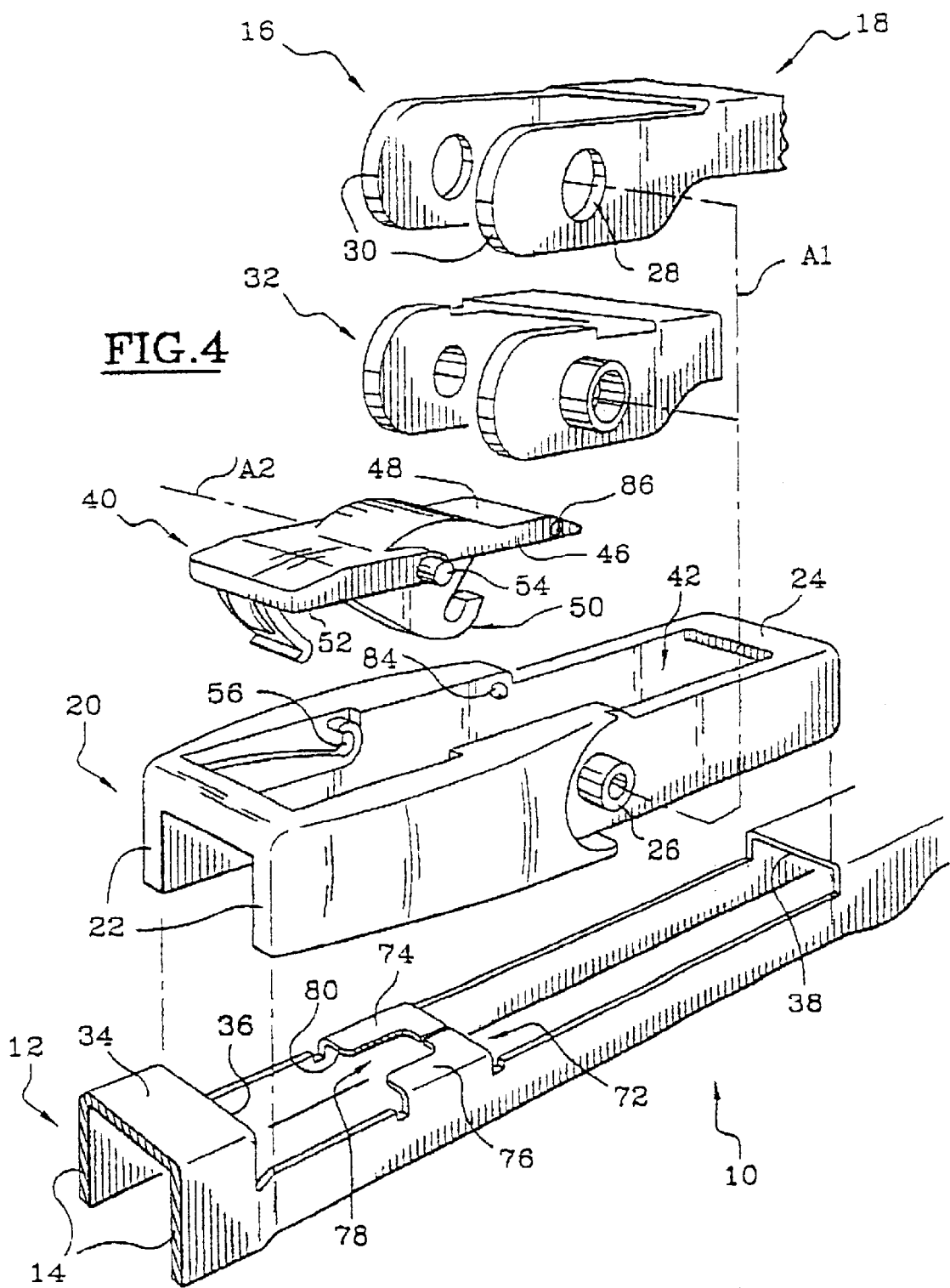

MOTOR VEHICLE WIPER COMPRISING A PIVOTING LOCK

BACKGROUND

This invention concerns a motor vehicle wiper containing a pivoting lock.

The invention relates, more specifically, to a motor vehicle wiper wherein a wiper blade is articulated to the longitudinal end of a wiper arm via a connector which is articulated on the arm and fixed over a linking portion of the blade, and wherein the linking portion includes two substantially longitudinal and parallel lateral flanges, and a transverse element extending between the two flanges and designed to co-operate with a mobile lock borne by the connector for fixing the connector on the blade.

The goal of this invention is to propose such a wiper wherein the handling of the lock of the connector is particularly simple and requires very little effort.

In addition, the goal of this invention is to propose a new conception of the lock that allows the user to see at a quick glance in what position, locked or unlocked, the lock is found.

SUMMARY

With this goal in mind, the invention proposes a motor vehicle wiper wherein a wiper blade is articulated to a longitudinal end of a wiper arm via a connector which is articulated on the arm and which is fixed over a linking portion of the blade, and wherein the linking portion includes two substantially longitudinal and parallel lateral flanges, and a transverse element extending between the two flanges and designed to co-operate with a mobile lock borne by the connector for fixing the connector on the blade, characterized in that the lock is articulated on the connector between a locking position and an unlocking position.

According to other characteristics of the invention:
- the lock is articulated onto the connector around a transversal axis;
- the connector is pushed towards the arm onto the linking portion of the blade, and the lock co-operates with an inner face of the transverse element;
- the lock contains a hooked lug which is received between the flanges of the blade, which, in locking position, co-operates with the transverse element and which, in unlocking position, is longitudinally cleared in relation to the transverse element;
- the transverse element is formed by a plate element which stretches between the two flanges and which is provided with a longitudinal slot which unlocks in a front transverse edge of the plate element; in an unlocking position of the lock, the plate extends opposite the flap and, in a locking position, the hanging lug co-operates by pushing against a face of the abutment plate element which is longitudinally arranged behind the slit;
- the lock includes the abutment means that determine its locking and unlocking positions;
- the lock includes the elastic means that force it towards either of the locking or unlocking positions;
- the lock includes an elastic lug which substantially extends in a circular arc around the axis of articulation of the lock and which includes a cam surface which, while the lock is between the locking and unlocking positions, co-operates with a fixed surface of the connector in order to elastically deform the lug;
- the lock includes a handling plate that extends perpendicular to the axis of articulation of the lock;
- the handling plate includes, at a free end, an elastic fitting means that co-operates with the complementary means of the connector in order to hold the lock in a locking position; and
- the lock includes a part which, while the lock arrives in unlocking position, co-operates with the blade in a manner to provoke a detachment of the connector in relation to the blade.

DETAILED DESCRIPTION OF THE DRAWINGS

Other characteristics and advantages of the invention will appear in the reading of the detailed description which follows, for the comprehension of which one will refer to the attached drawings in which:

FIG. 4 is an exploded perspective view of a second method of development of the invention;

Figure 1:
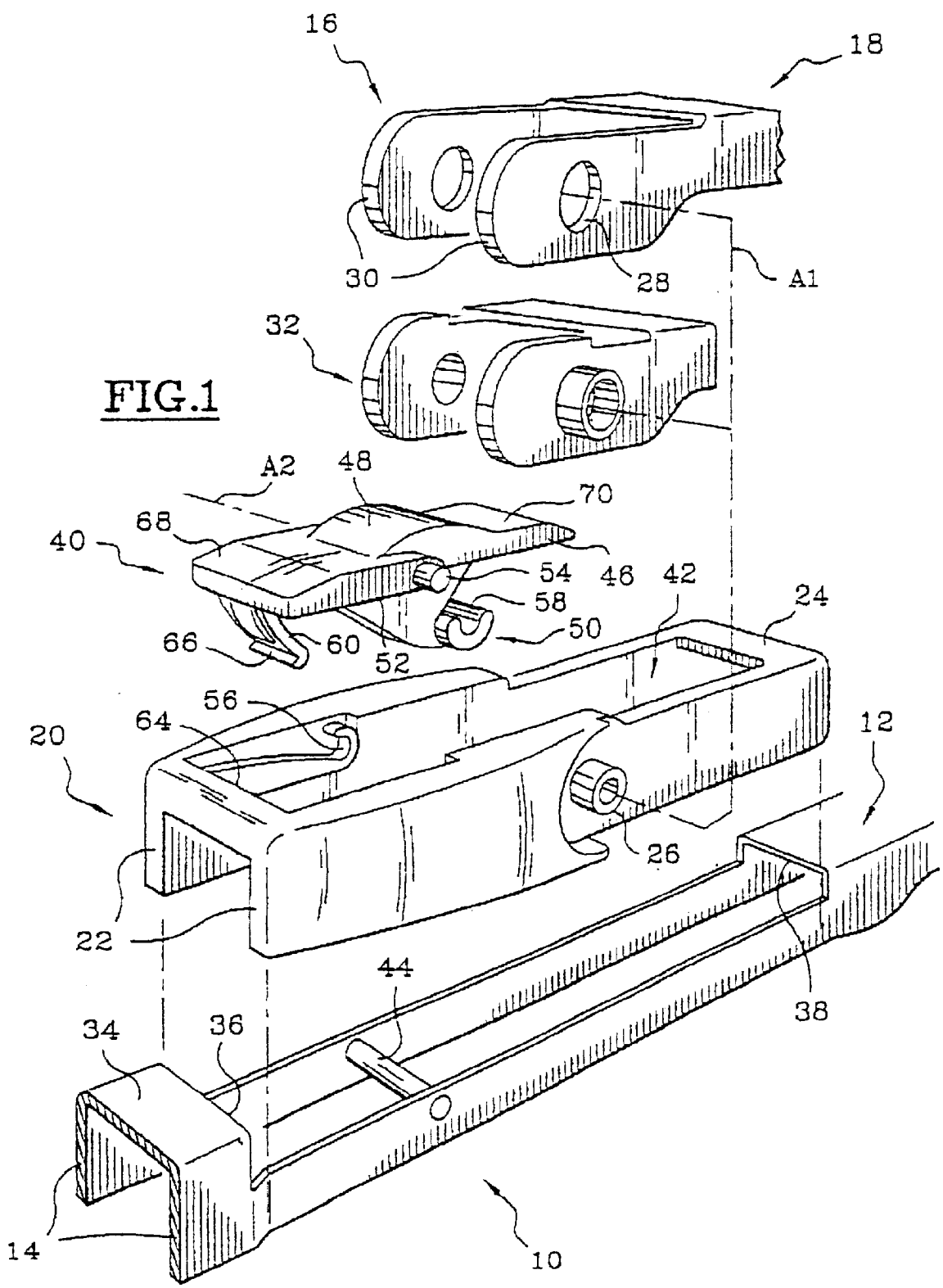
FIG. 1 is an exploded perspective view of a wiper conforming to the specifications of the invention.

Represented on FIG. 1 is the linking portion 10 of a wiper blade 12 of a motor vehicle. The linking portion 10 is, for example, formed by the central portion of a principle binding of the wiper 12. The linking portion 10 includes for the main thing, two parallel longitudinal flanges 14 that extend according to the longitudinal direction of the blade 12.

The blade 12 is designed to be mounted at the free longitudinal end 16 of a wiper arm 18 that has, as a function, first to flatten the blade 12 against a window to be wiped and, second, to guide the blade 12 in an alternating sweeping motion so that the blade 12 moves itself along the window.

The blade 12 is designed to be articulated on the arm 18 via a connector 20 that is mounted articulated in rotation around a transversal axis A1 on the arm 18 and that is fixed on the linking portion 10 of the blade 12.

The connector 20 is generally realized in a plastic manner and includes as a main feature two lateral flanges 22 joined by a transversal upper back 24. In the transversal cut, the connector 20 is thus in the form of an upside-down U and is designed to straddle the linking portion 10 of the blade 12, the two flanges 14 of the blade 12 being received between the two flanges 22 of the connector 20.

The flanges 22 of the connector 20 each include a cylindrical kingpin 26 which extends transversally towards the exterior, each kingpin 26 being received in an orifice 28 adjusted into one of two panels 30 from the free end 16 of the arm 18. The two panels 30 extend longitudinally and parallel from one another in order to form a tread, the flanges 22 of the connector 20 being received transversally between the two panels 30.

The kingpins 26 thus assure the mounting in rotation of the connector 20 in relation to the arm 18.

In the example of the realization illustrated in FIG. 1, an intermediary piece 32 is interposed between the connector 20 and the free end 16 of the arm 18 in order to simultaneously limit the play of functioning and reduce the wear and the noise which can result from the movement relative to the controller 20 in relation to the arm 18.

Conforming to the specifications of the invention, the connector 20 includes means that assure its fixation in a rigid manner on the linking portion 10 of the blade 12.

As one can see in FIG. 1, the binding of the blade 12 presents a transversal upper back 34 which joins the flanges 14 outside of the linking portion 10, which is thus marked longitudinally by two transversal edges 36, 38 of the back 34.

The connector 20, which straddles the linking portion 10, is immobilized longitudinally in the two directions in relation to the blade 12 coming into contact longitudinally against each of the two transversal edges 36, 38.

In order to assure the total immobilization of the connector 20, it suffices to prevent all movement of the vertical recess towards the top of the connector 20 in relation to the linking portion 10.

Figure 2:
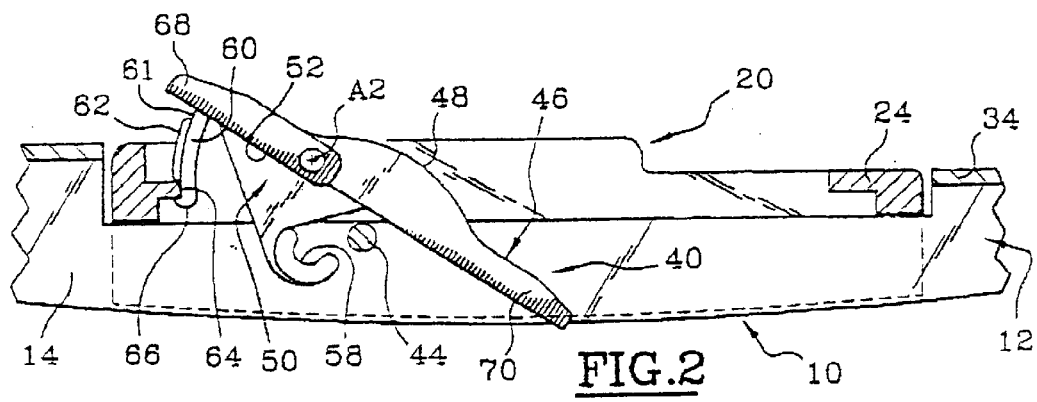
FIGS. 2 and 3 are longitudinal cut views of the wiper in FIG. 1, the lock being represented in unlocked and locked positions, respectively.
Figure 3:
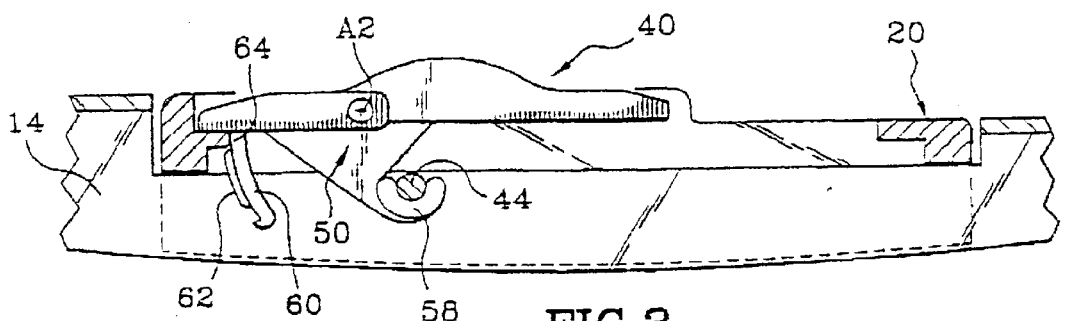

In order to do this, and conforming to the specifications of the invention, the connector 20 includes a lock 40 which is pivotally mounted around a transversal axis A2, parallel to the transversal axis A1 of the pivoting of the connector 20 in relation to the arm 18, between an unlocking position illustrated in FIG. 2 and a locking position illustrated in FIG. 3.

The lock 40 is designed to co-operate with a transversal rod 44 that joins the two flanges 14 of the linking portion 10 of the blade.

The lock 40 is received in an aperture 42 equipped in the upper back 24 of the connector 20.

As one can see, for example, in FIG. 1, the lock 40 includes as the main element an upper mounting plate 46 which, while the lock 40 is in the locking position, extends substantially in the plane of the upper back 24 of the connector 20.

The upper face 48 of the handling plate 46 is thus accessible from the exterior of the handling plate while a hooked lug 50, that extends from an interior face 52 of the plate 46, is received between the two flanges 22 of the connector 20 and between the two flanges 14 of the linking portion 10 of the blade 12.

For its articulation around the axis A2, the lock 40 includes two pieces 54 that extend transversally towards the longitudinal edges of the plate 40 in order to be received in the complimentary housing 56 adjusted in the internal faces of the flanges 22 of the connector 20. As one can see in FIG. 1, the pieces 54 of the lock 40 are received in the housing 56 via elastic bindings by inserting the lock 40 into the interior of the aperture 42, substantially higher towards the bottom and slightly in front of the rear according to the longitudinal direction.

As one can see in FIGS. 1 to 3, the hooked lug 50, which is attached below the upper plate 46, and thus below axis A2 of articulation of the lock 40 on the connector 20, carries at its lower end a groove 58 that is in the form of a half cylindrical tube of the transversal axis. The groove 58 is open towards the top while the lock 40 is in its locking position illustrated in FIG. 3 and the cylindrical internal surface of the groove 85 is of the same diameter as the transversal rod 44 of the blade 12.

The lock 40 includes, in addition, the means that allow the immobilization in one or the other of the locking or unlocking positions in relation to the connector 20.

In the first method of production of the invention, the lock 40 includes an elastic lug 60 that extends substantially in a circular arc around the axis A2, towards the bottom, from one front longitudinal end of the lower face 52 of the handling plate 46. The elastic lug 60 presents a front face 61 that, while the lock 40 pivots between its locking and unlocking positions, displaces itself with respect to a front transversal edge 64 of the aperture 42 of the connector 20.

At its interior free end, the elastic lug 60 has a lip 66 that extends towards the front and which is designed to come into contact against the transversal edge 64 of the aperture 42 while the lock 40 achieves its unlocking position in order to form an abutment and limit the course of movement of the lock 40. The angular course of the lock 40 is thus substantially equal to the angular length of the lug 60 around the axis A1.

The elastic flap 60 presents, on its front face, an embossed area 62 that extends around the axis A2 on the interior angle at the angular length of the elastic flap 60. In this way, the embossing 62 angularly stops before the lower face 52 of the plate 46 and in front of the lip 66 of the plate 60.

The embossing 62 is created in such a way that, while it is opposite from the transversal edge 64, it provokes an elastic deformation of the plate 60 by coming into contact against this edge 64. Preferably, the embossing 62 is not shaped like a cylindrical arc centered on the axis A2 in such a way that, while it pushes against the edge 64, it is in an unstable balanced position and tends to force the lock 40 towards one or the other of the locking or unlocking positions.

In the unlocking position, the plate 46 of the plate 40 is inclined in relation to the plane of the upper back 24 of the connector 20 in such a manner that one front part 68 of this upper back 24 raises above the level of this plane while a rear part 70 of the plate 46 extends below the plane and is, thus, received between the flanges 22 of the connector 20. In this way, while the connector 20 is presented just above the linking portion 10 of the blade 12, the hooked lug 50 is found shifted longitudinally towards the front via a transverse element 44. In this way, the groove 58 and the transversal rod 44 can interfere and it is possible to engage the connector 20 straddling on the linking portion 10.

By making the lock 40 toggle around the axis A2, in such a way to bring the plate 46 back into the plane of the upper back 24 of the connector 20, the groove 58 of the hooked lug 50 is brought towards the rear just below the transversal rod 44.

As one can see more specifically on FIG. 3, the cylindrical internal surface of the groove 58 is of the same diameter as the transversal rod 44 such that, in the locking position of the lock 40, the groove 58 comes to engage around the lower part of the external face of the rod 44.

In this way, while the lock 40 is in the locking position, the connector 20 and the lock 40 unit can be vertically cleared towards the top in relation to the blade 12 so well that the arm 18 and the blade 12 are linked in rotation one to the other around the axis A1.

When the user wants to separate the blade 12 from the arm 18, the user makes the blade 12 act against an upper face of the handling plate 46, for example, by pushing against the bottom on the rear part 70 in such a way to free the groove 58 of the transversal rod 44.

When freed from the lock 40, the blade 12 can then be separated from the connector 20 which stays attached to the arm 18.

Eventually, one can expect that the rear part 70 of the handling plate 46 comes in contact against upper longitudinal edges of the flanges 14 in such a way that, when the user provokes the rotation of the lock 40 towards its unlocking position, it not only provokes the unlocking of the blade 12, but also the separation of the blade 12 from the connector 20 by pushing again the articulating portion 10 of the blade 12 towards the bottom.

Figure 5:
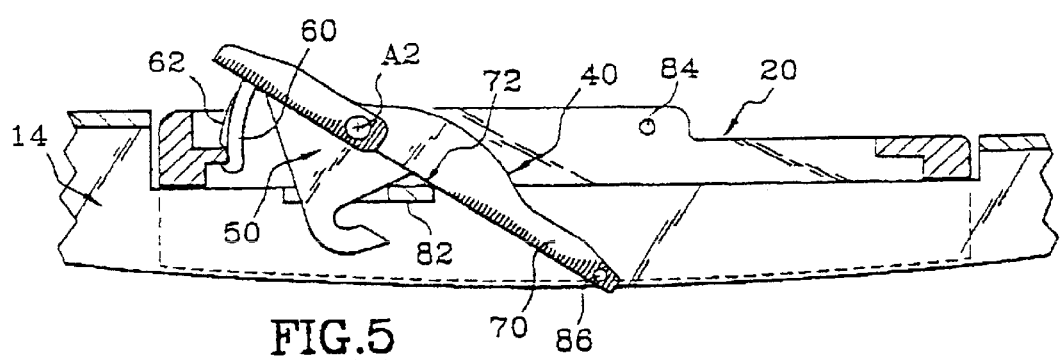
FIGS. 5 and 6 are views similar to FIGS. 1 and 2 respectively, illustrating a second method of development of the invention.
Figure 6:
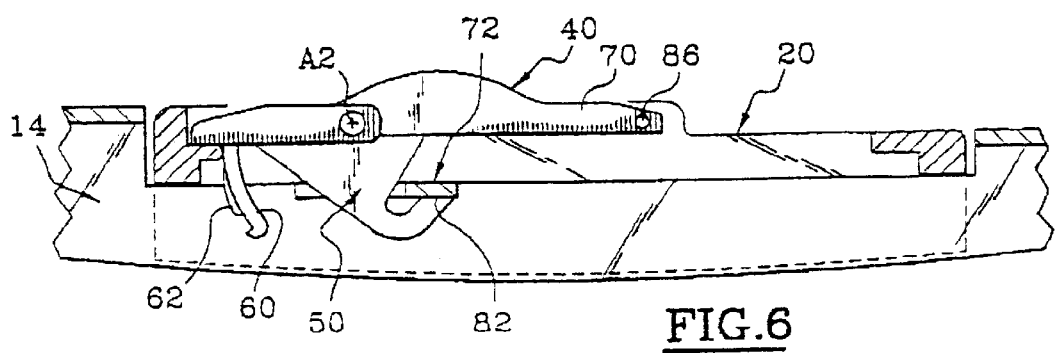

In the second example of production of the invention that is illustrated in FIGS. 4 to 6, the two flanges 14 of the linking portion 10 of the blade 12 are not linked by a transversal rod, but by a transverse element 72 that is created via continuity of material with the flanges 14.

In this second method of production, the transverse element 72 is formed from two flaps 74, 76 that each extend from an upper longitudinal edge of each of the flanges 14 of the linking portion 10 and that are transversally bent in the direction of the opposite flange 14, each flap 74, 76 extending transversally on half of the transversal length of the linking portion 10. The transverse element 72 can also be realized in the form of a continuous plate joining the two flanges 14.

The transverse element 72 is arranged longitudinally to the front third of the linking portion 10 and it includes a longitudinal slit 78 which extends longitudinally on roughly three quarters of its length and which longitudinally unblocks in a front edge 80 the transverse element 72. The slit 78 is symmetrically placed at the center of the two flanges 14 in the transversal direction and is formed by two corresponding openings equipped into each of the two flaps 74, 76 that form the transverse element 72.

In this second method of production according to the invention, the hooked lug 50 presents a lower end in the shape of a hook such that, as one can see on FIG. 6, when the lock 40 is in a locking position, the free end of the hook, which is turned towards the top, is pushed against a lower face 82 of the transverse element 72. The lower face 82 is in reality split on the two flaps 74, 76 and is longitudinally arranged behind the longitudinal slit 78, in a rear zone of the transverse element 72 at the level of which the two flaps 74, 76 are almost in contact with each other.

However, as one can see on FIG. 5, while the lock is in an unlocking position, the lower end in the shape of a hook of the hooked lug 50 extends vertically opposite from the slit 78 of the transverse element 44. The slit 78 and the hooked lug 50 are of the same transversal size, such that, in this unlocking position, the connector 20 is free to be released or inserted vertically in relation to the linking portion 10 of the blade 12.

In this production model of the invention, the lock 40 is held in locking position due to the blocks 84 that extend transversally towards the interior from the internal faces of the flanges 22 of the connector 20 in order to be received in the corresponding imprints 86 equipped into the rear end of the longitudinal edges of the rear part 70 of the handling plate 46.

What is claimed is:

1. A motor vehicle wiper wherein a wiper blade is articulated to a longitudinal end of a wiper arm by a connector articulated on the arm and fixed over a linking portion of the blade, wherein the linking portion includes two substantially longitudinal and parallel lateral flanges, and a transverse element extending between the two flanges and co-operating with a mobile lock carried by the connector for fixing the connector on the blade, characterized in that the lock is pivoted on the connector between a locking position and an unlocking position.

2. The wiper according to claim 1, wherein the connector is pushed towards a bottom on the linking portion of the blade and in that the lock co-operates with a lower face of the transverse element.

3. The wiper according to claim 1, wherein the lock includes a hooked lug that is rotatingly received between the flanges of the blade and that, in the locking position, co-operates with the transverse element and in the unlocking position, is disengaged in relation to the transverse element.

4. The wiper according to claim 1, wherein the lock includes abutment means for locating the locking and unlocking positions in relation to the connector.

5. The wiper according to claim 1, wherein the lock includes elastic means that force the lock toward either the locking position or the unlocking position.

6. The wiper according to claim 1, wherein said transverse element is a rod, wherein the lock disengages from a locked position when a rear part of the lock is depressed and a hooked lug on the lock disengages from the rod located on the wiper blade permitting detachment of the blade from the connector.

7. A motor vehicle wiper wherein a wiper blade is articulated to a longitudinal end of a wiper arm by a connector articulated on the arm and fixed over a linking portion of the blade, wherein the linking portion includes two substantially longitudinal and parallel lateral flanges, and a transverse element extending between the two flanges and co-operating with a mobile lock carried by the connector for fixing the connector on the blade, characterized in that the lock is articulated on the connector between a locking position and an unlocking position, and the lock is articulated on the connector around a transverse axis.

8. A motor vehicle wiper wherein a wiper blade is articulated to a longitudinal end of a wiper arm by a connector articulated on the arm and fixed over a linking portion of the blade, wherein the linking portion includes two substantially longitudinal and parallel lateral flanges, and a transverse element extending between the two flanges and co-operating with a mobile lock carried by the connector for fixing the connector on the blade, characterized in that the lock is articulated on the connector between a locking position and an unlocking position, and the transverse element is formed by a plate element that extends between the two flanges and is equipped with a longitudinal slit formed in a front transversal edge of the plate element and that, in the unlocking position of the lock, a hooked lug extends opposite from the slit and that, in the locking position, the hooked lug co-operates by pushing against an abutment face of the plate element that is longitudinally arranged behind the slit.

9. A motor vehicle wiper wherein a wiper blade is articulated to a longitudinal end of a wiper arm by a connector articulated on the arm and fixed over a linking portion of the blade, wherein the linking portion includes two substantially longitudinal and parallel lateral flanges, and a transverse element extending between the two flanges and co-operating with a mobile lock carried by the connector for fixing the connector on the blade, characterized in that the lock is articulated on the connector between a locking position and an unlocking position, and the lock includes an elastic lug that extends substantially in a circular arc around an articulation axis of the lock and that includes a cam surface that, when the lock is between the locking and unlocking positions, co-operates with a fixed surface of the connector in order to elastically deform the lug.

10. The wiper according to claim 9, wherein the lock includes a handling plate that extends perpendicular to a transverse axis of the lock.

11. The wiper according to claim 10, wherein the handling plate includes, at a free end, elastic fittings that co-operate with complementary means of the connector for keeping the lock in a locking position.

12. A motor vehicle wiper comprising:

an articulated wiper blade pivotally connected to a longitudinal end of a wiper arm;

a connector positioned over a linking portion of the blade, the linking portion having two substantially longitudinal and parallel lateral flanges;

a transverse element extending between the two flanges of the linking portion; and a mobile lock carried by the connector and operably associated with the linking portion of the blade for connecting the connector with the blade, the lock pivoting on the connector between locked and unlocked positions.

13. The wiper of claim 12, wherein the connector positioned on the linking portion of the blade is held in position by the lock operably engaging a lower face of the transverse element.

14. The wiper of claim 12, wherein the lock further comprises:

a hooked lug rotatingly received between the flanges of the blade in the locked position the hooked lug rotatingly disengaged from the transverse element in the unlocked position.

15. The wiper of claim 12, wherein the lock further comprises:

abutment means for locating the locked and unlocked positions in relation to the connector.

16. The wiper of claim 12, wherein the lock further comprises:

elastic means for forcing the lock toward either the locked or the unlocked position.

17. The wiper of claim 12, wherein said transverse element is a rod, wherein the lock disengages from a locked position when a rear part of the lock is depressed and a hooked lug on the lock disengages from the rod located on the wiper blade permitting detachment of the blade from the connector.

18. A motor vehicle wiper comprising:

an articulated wiper blade pivotally connected to a longitudinal end of a wiper arm;

a connector positioned over a linking portion of the blade, the linking portion having two substantially longitudinal and parallel lateral flanges;

a transverse element extending between the two flanges of the linking portion; and a mobile lock carried by the connector and operably associated with the linking portion of the blade for connecting the connector with the blade, the lock pivoting on the connector between locked and unlocked positions, and the lock is articulated on the connector around a transverse axis.

19. A motor vehicle wiper comprising:

an articulated wiper blade pivotally connected to a longitudinal end of a wiper arm;

a connector positioned over a linking portion of the blade, the linking portion having two substantially longitudinal and parallel lateral flanges;

a transverse element extending between the two flanges of the linking portion, the transverse element formed by a plate element having a longitudinal slit formed therein, the plate extending between the two flanges of the wiper blade;

a mobile lock carried by the connector and operably associated with the linking portion of the blade for connecting the connector with the blade, the lock pivoting on the connector between locked position and unlocked positions; and a hooked lug extending apart from the plate in the unlocked position and the hooked lug engaging an abutment face of the plate element in the locked position.

20. A motor vehicle wiper comprising:

an articulated wiper blade pivotally connected to a longitudinal end of a wiper arm;

a connector positioned over a linking portion of the blade, the linking portion having two substantially longitudinal and parallel lateral flanges;

a transverse element extending between the two flanges of the linking portion;

a mobile lock carried by the connector and operably associated with the linking portion of the blade for connecting the connector with the blade, the lock pivoting on the connector between locked position and unlocked positions; and an elastic lug formed on the lock extending in an arcuate manner from an edge of the lock coinciding with an articulation axis of the lock, the elastic lug includes a cam surface for engaging a fixed surface of the connector when the lock is in the locked position.

21. The wiper of claim 20, wherein the lock further comprises:

a handling plate extending perpendicular to a transverse axis of the lock.

22. The wiper of claim 21, wherein the handling plate comprises:

elastic fittings extending outwardly from the handling plate along a transverse axis for engaging complementary means of the connector for keeping the lock in a locked position.

* * * * *